3,663,499
INJECTION MOLDED ARTICLES OF THERMO-PLASTIC POLYESTER RESINS CONTAINING TITANIUM DIOXIDE

Ludwig Brinkmann, Frankfurt am Main, Germany, assignor to Farbwerke Hoechst Aktiengesellschaft vormals Meister Lucius & Bruning, Frankfurt am Main, Germany
No Drawing. Continuation of application Ser. No. 782,483, Dec. 9, 1968. This application Jan. 7, 1971, Ser. No. 104,793
Claims priority, application Germany, Dec. 9, 1967, P 16 94 232.8
Int. Cl. C08g *51/04*
U.S. Cl. 260—40 R                    12 Claims

ABSTRACT OF THE DISCLOSURE

Thermoplastic moulding compositions of linear, saturated polyesters and titanium dioxide which can be processed in the thermoplastic range to obtain shaped articles of high impact strength and dimensional stability.

---

This application is a continuation of application Ser. No. 782,483, filed Dec. 9, 1968, and now abandoned.

The present invention relates to thermoplastic moulding compositions of polyesters containing titanium dioxide and a process for their manufacture.

It has already been proposed to process linear saturated polyesters of aromatic dicarboxylic acids by injection moulding. The processing by injection moulding of polyethylene terephthalate is of industrial importance. However, injection moulded articles of polyethylene terephthalate have the disadvantage after removal from the mould that they are not dimensionally stable as a result of after-crystallization, especially, at elevated temperatures. Various proposals have, therefore, been made to process polyethylene terephthalate with additions of inorganic substances with nucleating effect.

It has been described in Netherlands Pat. 6511744, for example, that inorganic substances insoluble in the polyester melt such as calcium carbonate, calcium sulfate, titanium dioxide or soot with a particle size below $2\mu$ accelerate the crystallization of the polyester mass in the mould. These inorganic substances are added to the polyester in amounts of from 0.001 to 0.5% by weight. Thereby it is achieved that at a sufficient moulding temperature the polycondensate reaches already in the moulding operation an optimum degree of crystallization and that later deformations and dimensional modifications by after-crystallization are substantially prevented. According to Netherlands Pat. 6511744 polyesters containing more than 0.2% by weight of the finely divided inorganic substance yield brittle shaped articles; with a content of more than 0.5% by weight of inorganic substance the shaped articles are said to be useless.

When examining the inorganic nucleating agents mentioned in Netherlands Pat. 6511744 it is found that the effect of accelerating the crystallization of the various nucleating agents with a comparable particle size is very different.

It appears that titanium dioxide is not very good nucleating agent. By processing polyethylene terephthalate containing 0.4% of titanium dioxide (particle size 0.5 to $1\mu$) shaped articles having a crystallization degree of more than 25% can be obtained, but the dimensional stability of these shaped articles is not satisfactory nor is the content of 0.4% of titanium dioxide in the shaped article of polyester sufficient to obtain a high degree of whiteness.

Now I have found that thermoplastic moulding compositions consisting of a mixture of linear saturated polyesters of aromatic dicarboxylic acids with saturated aliphatic or cycloaliphatic diols and titanium dioxide in amounts of from 0.6 to 15% by weight, preferably 1 to 5% by weight, calculated on the total mixture have excellent properties.

The moulding compositions in accordance with the invention may be processed into shaped articles of very high impact strength; the shaped articles distinguished themselves also by a high degree of whiteness.

The remarkable impact strength of the shaped articles was surprising because in view of the prior art very brittle and therefore useless shaped articles would have been expected. It was also surprising that moulding compositions containing the amounts of titanium dioxide in accordance with the invention, can be processed into dimensionally stable shaped articles even with short moulding times.

As linear saturated polyester of aromatic dicarboxylic acids polyethylene terephthalate is preferably used. Other polyesters, for example polycyclohexane - 1,4 - dimethylol terephthalate, may also be used. There may also be used modified polyethylene terephthalates, which contain, in addition to terephthalic acid, also other aromatic or aliphatic dicarboxylic acids as basic units, for example naphthalene-dicarboxylic acid-2,6 or adipic acid. There may also be used modified polyethylene terephthalates which contain, in addition to ethylene glycol, also other aliphatic diols, for example, neopentyl glycol or butanediol-1,4, as alcoholic component. Advantageously the polyesters have a reduced specific viscosity, determined in a 1% solution in phenol/tetrachlorethane 60:40 at 25° C., within the range of from 0.7 to 2, preferably 1.0 to 1.5.

The titanium dioxide may be of the rutile or the anatase type and may advantageously have a particle size below $2\mu$, preferably below $1\mu$. There may also be used titanium dioxides with particles sizes above $2\mu$ but it is then advantageous to use at the same time another nucleating agent of good effect, for example aluminum silicate, calcium carbonate or talc, wtih particle sizes below $2\mu$.

The titanium dioxide may be admixed with the polyester already during preparation. It is also possible to apply the titanium dioxide to the finished polyester granulates and to regranulate the latter once again, if necessary, for a better distribution of the titanium dioxide.

The moulding compositions shall contain the least possible moisture, preferably less than 0.02% by weight. The granulated moulding composition may be provided, if desired, with a coating of an inert hydrophobic material, for example wax or paraffin.

In order to obtain shaped articles with a sufficient crystallization degree when processing the moulding compositions it is suitable to maintain the mould temperature at a sufficiently high degree above the second order transition temperature of the polyester material used.

When using polyethylene terephthalate the temperature of the injection mould is advantageously maintained at 120 to 150° C. With the moulding compositions according to the invention high quality shaped articles, for example gears, coupling discs or water armatures can be manufactured.

The following examples serve to illustrate the invention, but are not intended to limit it:

EXAMPLE 1

5 kilograms of granular polyethylene terephthalate which contained 1.8% by weight of titanium dioxide were rolled in a rotary evaporator for 1 hour at 100° C. under a pressure of 0.5 millimeter of mercury and then for 8 hours at 240° C. under a pressure of 0.5 millimeter of mercury. The titanium dioxide (of the anatyse type) had been added in the preparation of the polyethylene terephthalate to the bis($\beta$-hydroxy-ethyl)-terephathalate melt after the ester-interchange had been finished and had a particle size of from 0.5 to 1μ. The granulates of the starting polyester had a reduced specific viscosity of 0.8 dl./g., measured in a 1% solution in phenol/tetrachlorethane 60:40 at 25° C.

After the post-condensation in the rotary evaporator the granular polyester containing titanium dioxide had a reduced specific viscosity of 1.2 dl./g. The material was injection-moulded into plates measuring 60 x 60 x 2 mm. at a moulding temperature of 150° C. and a moulding time of 30 seconds. The plates were free of distortion and had a density of 1.381. The impact strength of the plates was tested by a drop test. In this test, the plates were exposed to an impact stress by allowing a falling hammer to drop vertically from different heights onto the plates clamped in a frame. The tip of the dropping hammer represented a hemisphere having a radius of 10 mm.; the weight of the dropping hammer was 1 kilogram. 10 plates were tested for each height. Only at a drop height of 180 cm. the impact energy was sufficient to break 20% of the plates.

EXAMPLE 2 (COMPARISON EXAMPLE)

The same procedure was carried out as in Example 1, but a polyethylene terephthalate was used which contained only 0.4% by weight of the titanium dioxide used in Example 1. The reduced specific viscosity of the starting polyester was 0.78 dl./g., measured in a 1% solution in phenol/tetrachlorethane 60:40 at 25° C. After the postcondensation the polyester had a reduced specific viscosity of 1.22 dl./g. The polyester granulates were processed, as described in Example 1, by injection moulding. With moulding times of 30 seconds the plates showed a considerable distortion. The whiteness of the plates was considerably inferior to that obtained in Example 1.

What is claimed is:

1. A shaped, injection molded article consisting essentially of a mixture of
   (a) a linear, saturated polyester of an aromatic dicarboxylic acid and a saturated aliphatic or cycloaliphatic diol, said polyester having a reduced specific viscosity within the range of from 0.7 to 2 dl./g. measured in a 1% solution in 60:40 phenol/tetrachlorethane at 25° C., and
   (b) from 0.6 to 15%, calculated on the total weight of the mixture, of titanium dioxide.

2. A shaped, injection molded article as defined in claim 1, in which the amount of titanium dioxide is within the range of from 1 to 5% calculated on the total weight of the mixture.

3. A shaped, injection molded article as defined in claim 1, in which the linear saturated polyester is polyethylene terephthalate.

4. A shaped, injection molded article as defined in claim 1, in which the linear saturated polyester is polycyclohexane-11,4-dimethylol terephthalate.

5. A shaped, injection molded article as defined in claim 3, in which the linear saturated polyester contains, in addition to terephthalic acid, units of other aromatic or aliphatic dicarboxylic acids.

6. A shaped, injection molded article as defined in claim 5, in which the linear saturated polyester contains, in addition to terephthalic acid, units of dicarboxylic acids selected from the group consisting of naphthalene-dicarboxylic acid-2,6 and adipic acid.

7. A shaped, injection molded article as defined in claim 3, in which the linear, saturated polyester contains, in addition to ethylene glycol, units of other aliphatic diols.

8. A shaped, injection molded article as defined in claim 7, in which the linear, saturated polyester contains, in addition to ethylene glycol, units of diols selected from the group consisting of neopentyl glycol nad butanediol-1,4.

9. A shaped, injection molded article as defined in claim 1, in which the linear saturated polyester has a reduced specific viscosity within the range of from 1.0 to 1.5 dl./g. measured in a 1% solution in 60:40 phenol/tetrachloroethane at 25° C.

10. A shaped, injection molded article as defined in claim 1, in which the titanium dioxide has a particle size below 2μ.

11. A shaped, injection molded article as defined in claim 1, in which the titanium dioxide has a particle size below 1μ.

12. A shaped, injection molded article as defined in claim 1, which contains, in addition to titanium dioxide with a particle size above 2μ, another nucleating agent with a particle size below 2μ.

References Cited

UNITED STATES PATENTS 3,562,200    2/1971    Jones et al. _____ 260—4 OR
3,565,852    2/1971    Conix et al. _____ 260—4 OR LEWIS T. JACOBS, Primary Examiner